(12) United States Patent
Loui et al.

(10) Patent No.: US 10,991,008 B2
(45) Date of Patent: *Apr. 27, 2021

(54) METHOD, SYSTEM, AND MEDIUM FOR DISPLAYING AUTOMATICALLY PUSHING INFORMATION RELATED TO ITEMS OFFERED FOR SALE IN A NETWORK-BASED MARKETPLACE

(71) Applicant: EBAY INC., San Jose, CA (US)

(72) Inventors: Jeffrey Loui, San Francisco, CA (US); David Vogt, Menlo Park, CA (US); Jared Kaplan, Redwood City, CA (US); Tony Lam, Menlo Park, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/993,115

(22) Filed: May 30, 2018

(65) Prior Publication Data
US 2018/0276715 A1 Sep. 27, 2018

Related U.S. Application Data

(63) Continuation of application No. 14/100,191, filed on Dec. 9, 2013, now abandoned, which is a continuation
(Continued)

(51) Int. Cl.
*G06Q 30/00* (2012.01)
*G06Q 30/02* (2012.01)
(Continued)

(52) U.S. Cl.
CPC ..... *G06Q 30/0269* (2013.01); *G06Q 30/0225* (2013.01); *G06Q 30/0226* (2013.01); *G06Q 30/0276* (2013.01); *G06Q 30/06* (2013.01); *G06Q 30/0601* (2013.01); *G06Q 30/0631* (2013.01); *G06Q 30/0633* (2013.01); *G06Q 30/0641* (2013.01); *G06Q 30/08* (2013.01); *H05K 999/99* (2013.01)

(58) Field of Classification Search
CPC .................................................. G06Q 30/0601
USPC ....................................................... 705/26.1
See application file for complete search history.

(56) References Cited

U.S. PATENT DOCUMENTS

| 5,761,649 A | 6/1998 | Hill |
| 7,321,887 B2 | 1/2008 | Dorner et al. |

(Continued)

OTHER PUBLICATIONS

Butterfield, John, Products Online, Mid-Apr. 2007, Hanley-Wood, Incorporated, vol. 30, Issue 6 (Year: 2007).*
(Continued)

*Primary Examiner* — Brittney N Miller
(74) *Attorney, Agent, or Firm* — Faegre Drinker

(57) ABSTRACT

A system for transmitting information related to a network-based marketplace includes identifying information that may be interesting, useful, and entertaining to the users and to the potential users of the network-based marketplace. The identified information may be other than information that is already being displayed in listings by the network-based marketplace. The identified information may be about the sellers, the buyers or other items related to the items offered for sale.

20 Claims, 11 Drawing Sheets

Related U.S. Application Data of application No. 12/261,992, filed on Oct. 30, 2008, now Pat. No. 8,700,491.

(60) Provisional application No. 61/022,580, filed on Jan. 22, 2008.

(51) Int. Cl.
*G06Q 30/06* (2012.01)
*G06Q 30/08* (2012.01)

(56) References Cited

U.S. PATENT DOCUMENTS

| | | | |
|---|---|---|---|
| 7,373,313 | B1 | 5/2008 | Kahle et al. |
| 8,700,491 | B2 | 4/2014 | Loui et al. |
| 9,639,883 | B2 | 5/2017 | Loui et al. |
| 2001/0034697 | A1 | 10/2001 | Kaen |
| 2002/0007322 | A1 | 1/2002 | Stromberg |
| 2002/0116320 | A1 | 8/2002 | Nassiri |
| 2002/0143659 | A1 | 10/2002 | Keezer et al. |
| 2003/0061039 | A1 | 3/2003 | Levin |
| 2003/0078858 | A1 | 4/2003 | Angelopoulos et al. |
| 2003/0084453 | A1 | 5/2003 | Laughlin et al. |
| 2003/0105682 | A1* | 6/2003 | Dicker .......... G06Q 30/02 705/26.8 |
| 2003/0177075 | A1 | 9/2003 | Burke |
| 2005/0144052 | A1* | 6/2005 | Harding .......... G06Q 10/087 705/26.1 |
| 2005/0182705 | A1 | 8/2005 | McLemore et al. |
| 2006/0064347 | A1 | 3/2006 | Robinson et al. |
| 2006/0085268 | A1 | 4/2006 | Imendorf et al. |
| 2007/0043621 | A1* | 2/2007 | Collins .......... G01G 19/4144 705/14.1 |
| 2007/0208635 | A1 | 9/2007 | Van Luchene et al. |
| 2007/0250901 | A1 | 10/2007 | McIntire et al. |
| 2007/0271151 | A1 | 11/2007 | Torres et al. |
| 2007/0294140 | A1 | 12/2007 | Bezos et al. |
| 2008/0215456 | A1 | 9/2008 | West et al. |
| 2009/0048941 | A1 | 2/2009 | Strassmann |
| 2009/0063288 | A1 | 3/2009 | Croes |
| 2009/0119166 | A1 | 5/2009 | Taylor et al. |
| 2009/0187485 | A1 | 7/2009 | Loui et al. |
| 2014/0095351 | A1 | 4/2014 | Loui et al. |
| 2014/0195343 | A1 | 7/2014 | Loui et al. |
| 2017/0178198 | A1 | 6/2017 | Loui et al. |

OTHER PUBLICATIONS

Non-Final Office Action received for U.S. Appl. No. 14/202,492, dated Nov. 20, 2015, 17 pages.
Saenz, Israel, "HGTVPro.com Visits Increase 200 Percent", Corpus Christi Caller-Time, Mar. 11, 2006, E1.
Applicant Initiated Interview Summary received for U.S. Appl. No. 12/261,992, dated Sep. 10, 2013, 3 pages.
Final Office Action received for U.S. Appl. No. 12/261,992, dated Jul. 12, 2013, 14 pages.
Final Office Action received for U.S. Appl. No. 12/261,992, dated Nov. 4, 2011, 13 pages.
Non-Final Office Action received for U.S. Appl. No. 12/261,992, dated Aug. 11, 2011, 17 pages.
Non-Final Office Action received for U.S. Appl. No. 12/261,992, dated Feb. 8, 2013, 14 pages.
Notice of Allowance received for U.S. Appl. No. 12/261,992, dated Nov. 20, 2013, 16 pages.
Response to Final Office Action filed on Feb. 6, 2012 for U.S. Appl. No. 12/261,992, dated Nov. 4, 2011, 14 pages.
Response to Final Office Action filed on Sep. 30, 2013 for U.S. Appl. No. 12/261,992, dated Jul. 12, 2013, 11 pages.
Response to Non-Final Office Action filed on May 6, 2013 for U.S. Appl. No. 12/261,992, dated Feb. 8, 2013, 13 pages.
Response to Non-Final Office Action filed on Sep. 16, 2011 for U.S. Appl. No. 12/261,992, dated Aug. 11, 2011, 14 pages.
Restriction Requirement received for U.S. Appl. No. 12/261,992, dated May 20, 2011, 7 pages.
Response to Restriction Requirement filed on Jun. 20, 2011 for U.S. Appl. No. 12/261,992, dated May 20, 2011, 5 pages.
Kelvin, "Top 10 Slides How Sites on Myspace", available online @ https://mashable.com/2006/10/31/top-10-slideshow-sites-on-myspace/#TCWLJvFw_mqr, Oct. 31, 2006, 9 pages.
Non-Final Office Action received for U.S. Appl. No. 14/202,492, dated Sep. 15, 2016, 26 pages.
Notice of Allowance received for U.S. Appl. No. 14/202,492, dated Dec. 30, 2016, 17 pages.
Preliminary Amendment filed for U.S. Appl. No. 14/202,492, filed Mar. 20, 2014, 8 pages.
Response to Non-Final Office Action filed on Mar. 1, 2016 for U.S. Appl. No. 14/202,492, dated Nov. 20, 2015, 16 pages.
Response to Non-Final Office Action filed on Sep. 28, 2016 for U.S. Appl. No. 14/202,492, dated Sep. 15, 2016, 11 pages.
Preliminary Amendment filed for U.S. Appl. No. 15/446,627, filed Mar. 28, 2017, 9 pages.
Appeal Brief filed for U.S. Appl. No. 14/100,191, filed Jun. 1, 2016, 24 pages.
Applicant Initiated Interview Summary received for U.S. Appl. No. 14/100,191, dated Feb. 3, 2016, 3 pages.
Examiner's Answer to Appeal Brief received for U.S. Appl. No. 14/100,191, dated Jul. 28, 2016, 12 pages.
Final Office Action received for U.S. Appl. No. 14/100,191, dated Mar. 1, 2016, 12 pages.
Non-Final Office Action received for U.S. Appl. No. 14/100,191, dated Nov. 23, 2015, 15 pages.
Preliminary Amendment filed for U.S. Appl. No. 14/100,191, filed Dec. 10, 2013, 7 pages.
Reply Brief filed on Sep. 22, 2016, for U.S. Appl. No. 14/100,191, 5 pages.
Response to Non-Final Office Action filed on Jan. 27, 2016 for U.S. Appl. No. 14/100,191, dated Nov. 23, 2015, 15 pages.
Final Office Action received for U.S. Appl. No. 14/202,492, dated May 31, 2016, 21 pages.
Response to Final Office Action filed on Aug. 19, 2016, for U.S. Appl. No. 14/202,492, dated May 31, 2016, 16 pages.
First Action Interview—Pre-Interview Communication received for U.S. Appl. No. 15/446,627, dated Jan. 28, 2019, 3 pages.
First Action Interview—Office Action Summary Received for U.S. Appl. No. 15/446,627, dated Apr. 10, 2019, 8 pages.

* cited by examiner

METHOD, SYSTEM, AND MEDIUM FOR DISPLAYING AUTOMATICALLY PUSHING INFORMATION RELATED TO ITEMS OFFERED FOR SALE IN A NETWORK-BASED MARKETPLACE

CROSS-REFERENCE TO RELATED APPLICATIONS

This application is a continuation of U.S. application Ser. No. 14/100,191, filed Dec. 9, 2013, which is a continuation of U.S. application Ser. No. 12/261,992, filed on Oct. 30, 2008 now issued U.S. Pat. No. 8,700,491, which is claiming priority under 35 USC § 119(e) to U.S. Provisional Patent Application No. 61/022,580 entitled "METHOD AND SYSTEM OF DISPLAYING INFORMATION RELATED TO ITEMS OFFERED FOR SALE" that was filed on Jan. 22, 2008. All applications are incorporated by reference in their entirety.

FIELD

The disclosed subject matter relates generally to the field of data processing and, in one example embodiment, to a system to display information related to items associated with a network-based marketplace.

BACKGROUND

Network-based marketplaces provide the sellers opportunities to offer their items to potential buyers online. The items may be offered for sale in an auction-format or in a fixed-price-format. Some sellers may be occasional sellers selling a few items, while other sellers may be power sellers selling hundreds or thousands of items.

Potential buyers may visit the web sites to browse and search for items that they may be interested in buying. In an auction-format, there may be multiple buyers interested in the same item listed by a seller. The buyers may browse the listings and review the information provided by the sellers before deciding to place a bid.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

Figure 1:
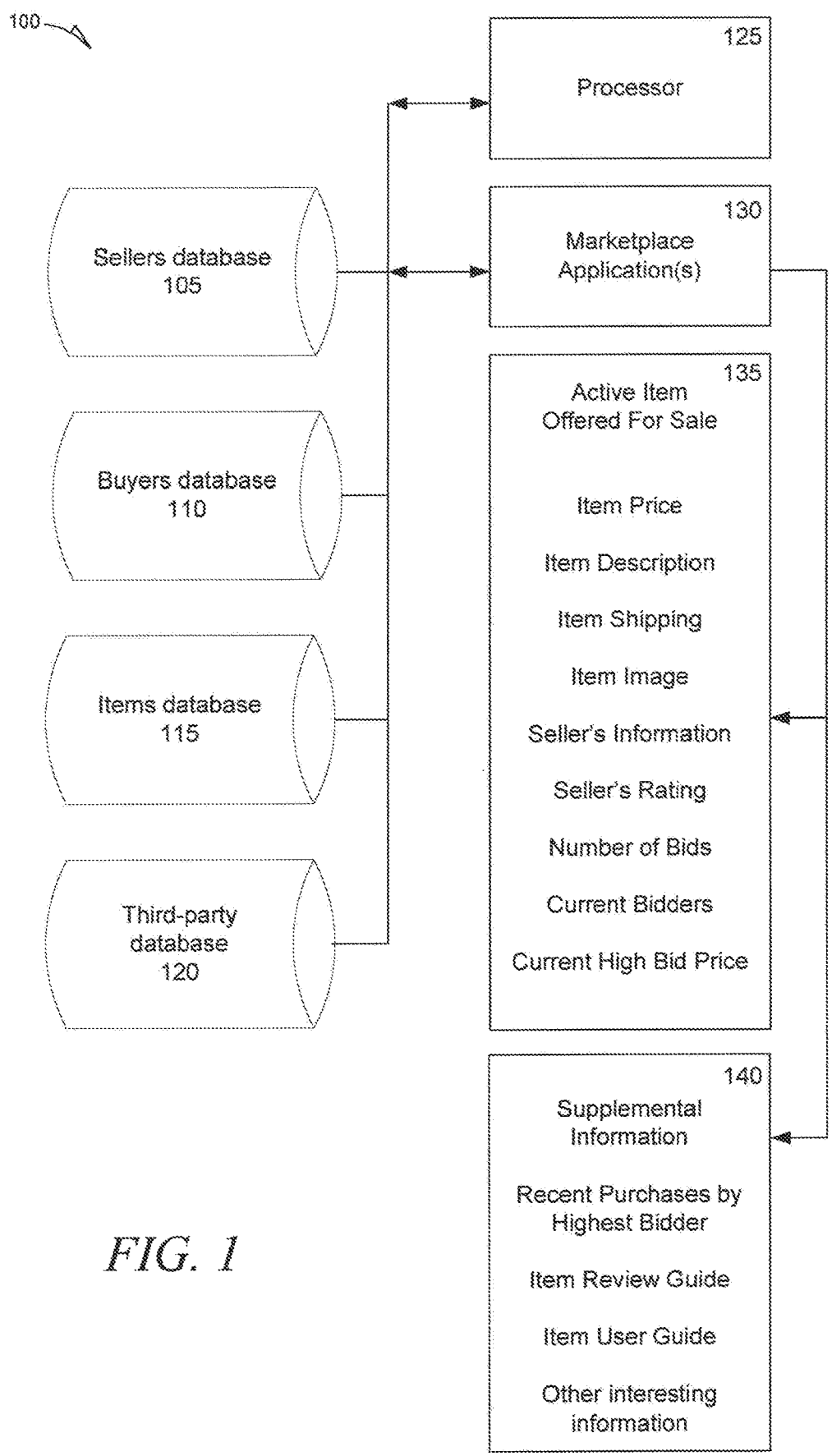
FIG. 1 is a block diagram illustrating a system that uses supplemental information related to the items offered for sale, in accordance with some example embodiments.

According to some example embodiments, a method and a system for displaying information associated with items offered for sale is disclosed. The items may include at least those currently offered for sale or those that were offered for sale. The information may be about sellers, buyers or other items related to the items offered for sale. The information may be presented together with the items currently offered for sale. For some example embodiments, the information may be presented independently of the items currently offered for sale.

Other features will be apparent from the accompanying drawings and from the detailed description that follows. In the following description, for purposes of explanation, numerous specific details are set forth in order to provide a thorough understanding of embodiments. It will be evident, however, to one skilled in the art that the present description may be practiced without these specific details.

In some example embodiments, a computer system (e.g., a client machine, server machine etc) configured by an application may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

Introduction

In traditional network-based marketplaces associated with electronic publishing and/or sales systems, there may be many items offered for sale at the same time. The items offered for sale are often associated with listings that are presented in similar format with, for example, price information, description information, shipping information, etc. Use of the similar format does not enhance the items desirability. It is typically up to the sellers of the items to create a description that is attractive to the potential buyers. Often, the description is only about the item offered for sale. Some network-based marketplaces may store information about the sellers, the buyers and the items offered for sale over a long period of time.

Typically, an item offered for sale in a network-based marketplace may remain available or active for a certain period of time. For example, when using the auction format, an item may remain available for seven (7) days before the auction ends. During that period, the level of activities may be sporadic, and it may be boring for users to view the same information associated with the item for any extended period of time.

For some example embodiments, the stored information may be used to attract users to the network-based marketplaces, to enhance the user experience when buying or selling the items offered for sale, or to entertain the users. The stored information may be used in conjunction with information available from other sources external to the network-based marketplaces. The combination of at least the stored information or the information available from the other sources may be referred to generally as supplemental information. In the following description, the term "user" may be used to refer to a buyer, a potential buyer, a seller, a potential seller, or just someone who is viewing the supplemental information (e.g., for entertainment).

Data Structure

FIG. 1 is a block diagram illustrating a system that uses supplemental information related to the items offered for sale, in accordance with some example embodiments. System 100 includes processor 125, marketplace application(s) 130, and one or more databases 105-120. The databases may include seller database 105, buyer database 110, and item database 115. There may also be a third-party database 120. The seller database 105 and the buyer database 110 may be configured to store information about the sellers and the buyers who participate in a network-based marketplace associated with the system 100. The items database 115 may be configured to store information about the items that are currently offered for sale in the networked-base marketplace. The items database 115 may also be configured to store information about items that were sold. For some example embodiments, the items database 115 may store information about items that were listed for sale but were not sold or canceled. The third-party database 120 may store information about the items that may not be available in the seller database 105, the buyer database 110 or the item database 115. For example, the third-party database 120 may be associated with a manufacturer of the item and may offer how-to-use information. The third-party database 120 may be associated with a company that offers information for a fee.

For some example embodiments, the marketplace application(s) 130 may use the information stored in one or more of the databases 105-120 to generate listing 135 to present information associated with an item offered for sale. For example, when the listing 135 is associated with an auction item, the listing 135 may include standard information such as price, description, shipping, image, seller's information, seller's rating, current number of bids, current bidders and current bid price. For some example embodiments, the marketplace application(s) 130 may use the information stored in the one or more databases 105-120 to generate the supplemental information 140. For example, the supplemental information 140 may include recent purchases by the highest bidder, an item review guide, an item user guide, or interesting items previously purchased by one of the current bidder, etc.

The supplemental information 140 may generally include information that is interesting and entertaining. The supplemental information 140 may include information that is not normally included in the listing 135. It may be viewed that the supplemental information is indirectly related to the item associated with the listing 135. For example, the listing 135 may include directly related information such as price, item condition, seller, shipping, etc., while the supplemental information 140 may include indirectly related information such as the seller's other active transactions, the seller's previous transactions, the buyer's other active transactions, the buyer's previous transactions, the prices of similar items in other active and closed transactions, the recent purchases by the seller, the recent purchases by the buyer, etc. It may be noted that the supplemental information may be automatically pushed to a user rather than the user having to perform one or more searches.

Supplemental Information

Figure 2:
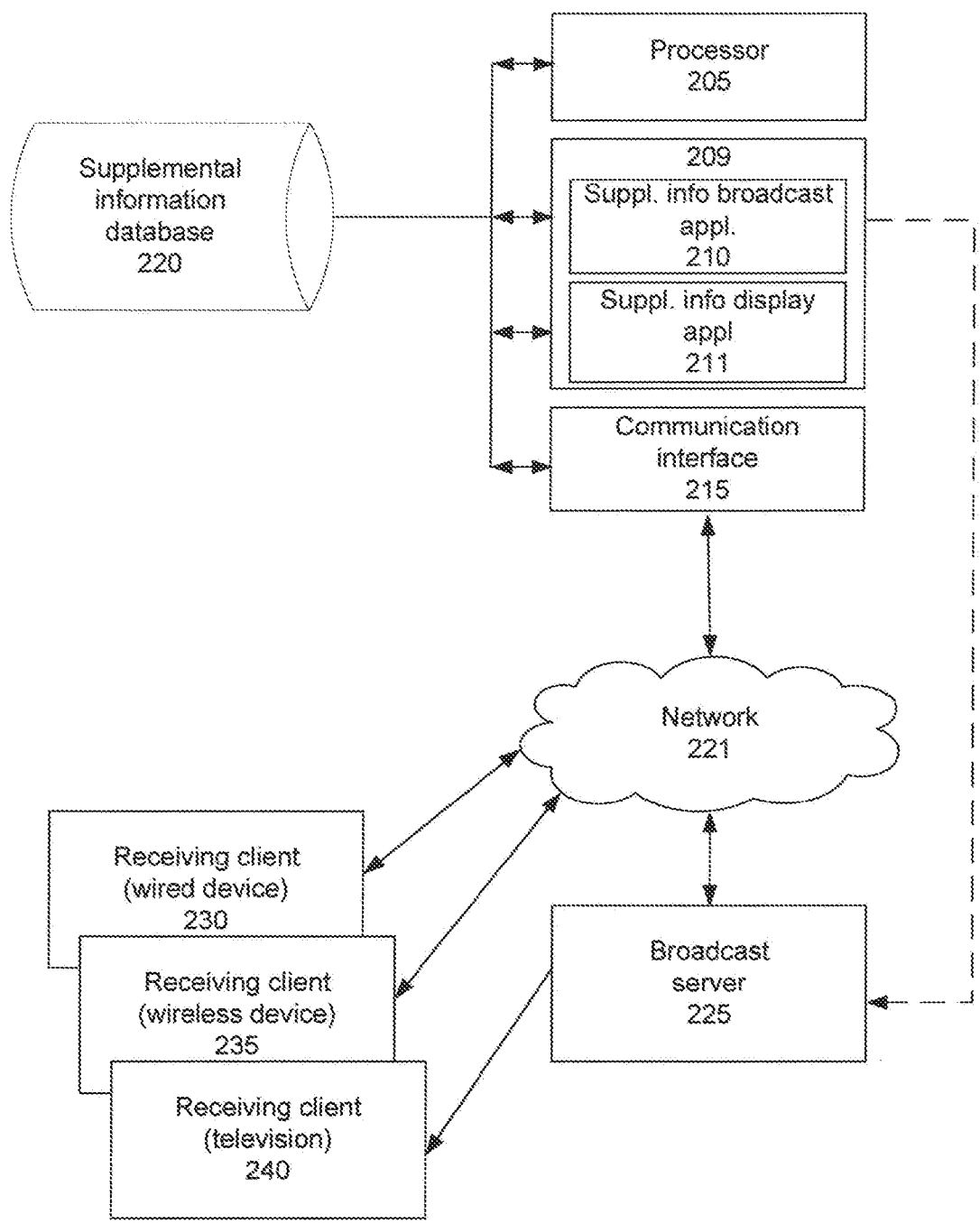
FIG. 2 is a block diagram illustrating examples that may be used to present the supplemental information, in accordance with some example embodiments.

FIG. 2 is a block diagram illustrating examples that may be used to present the supplemental information, in accordance with some example embodiments. Supplemental information database 220 may include information stored in one or more of the databases 105-120 illustrated in FIG. 1. The supplemental information database 220 may be coupled with a processor 205 and supplemental information applications 209. The processor 205 may execute instructions associated with the supplemental information application 209, which may include supplemental information broadcast application 210 and supplemental information display application 211. The supplemental information applications 209 may be included in the marketplace applications 130 (illustrated in FIG. 1).

The supplemental information broadcast application 210 may retrieve and process the supplemental information from the supplemental information database 220 and then broadcast the supplemental information as video streams. For some example embodiments, the supplemental information may be broadcast for entertainment purposes. For example, the broadcast of the supplemental information may encourage users to visit the network-based marketplace. Any standard broadcast techniques and devices may be used to broadcast the supplemental information 140. For example, the supplemental information 140 may be transmitted to a satellite and then retransmitted to one or more receiving stations.

Broadcast server 225 may be configured to receive broadcast signals. The broadcast server 225 may also be connected to the network 221. Merely as an example, a dotted line is used to demonstrate a connection between the broadcast server 225 and the supplemental information broadcast application 210. The supplemental information 140 may be transmitted by the broadcast server 225 to the receiving client 240. The receiving client 240 may be a television or any multimedia device capable of receiving and displaying the broadcast signals.

The supplemental information display applications 211 may retrieve and process the supplemental information from the supplemental information database 220 and then send the supplemental information 140 to the network 221 via the communication interface 215. For some example embodiments, the supplemental information 140 may be used to generate one or more multimedia programs. The multimedia programs may include, for example, texts, images, video streams, etc. The supplemental information 140 may be automatically pushed using available pushing technologies. For some example embodiments, the supplemental information 140 may be pushed to a webpage. The receiving clients 230-235 may include web browser software to enable a user to view the webpage. The webpage may be viewed using a wireless device (e.g., receiving client 235) or a wired device (e.g., receiving client 230). The supplemental information 140 may be pushed and viewed as part of the listing 135 or independent of the listing 135. The supplemental information 140 may be pushed to the same webpage as the listing

135. Alternatively, the supplemental information 140 may be pushed to a webpage separate from the webpage associated with the listing 135.

The supplemental information 140 may affect a user's decision about a value of an item offered for sale. For example, when the supplemental information 140 indicates that an item similar to the item offered for sale was sold at a higher price than a current asking price, the user may be more inclined to purchase the item at the current asking price. The supplemental information 140 may affect the user's decision about purchasing or placing a bid for an item offered for sale. For example, a user may determine against placing a bid or making a purchase when the supplemental information 140 indicates that the seller of the item offered for sale recently received a fraud complaint.

Database Operations

For some example embodiments, the supplemental information applications 209 may include operations that search for a subset of the active listings in the items database 115 (illustrated in FIG. 1) and generate the supplemental information 140 related to these active listings.

For some example embodiments, the subset of the active listings may include those active listings that are about to end and/or those active listings that have many activities. For example, when using the auction format, the activities may include bidding activities by potential buyers. The supplemental information 140 may include information related to the listing itself. For example, the supplemental information 140 may provide graphical representation that emphasizes the rapidness of the new bids coming in, the information about the potential buyers who submit the bids, and so on. The supplemental information, the dynamic change in the price of the item, and/or the dynamic change in the auction remaining time may together generate excitement and liveliness to the active listings.

For some example embodiments, the subset of the active listings may include those listings that have slow activities. In these situations, the supplemental information 140 may generate excitement to fill the low activities and possibly to generate activities. For some example embodiments, the supplemental information 140 may be generated for all active listings. When the listings close or when the items are sold, the associated supplemental information may be stored in the database 220.

Web Page Interface Example

Figure 3:
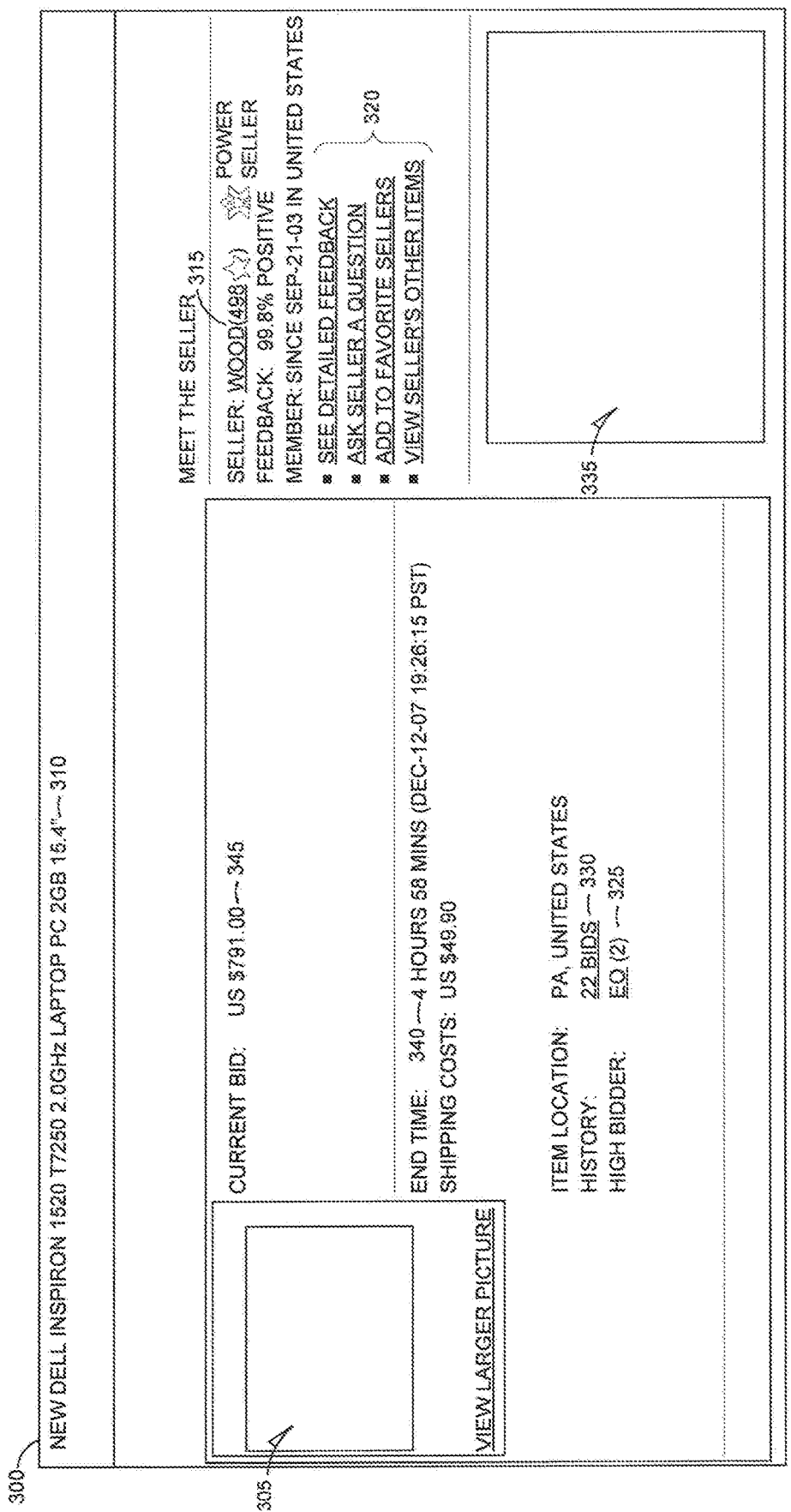
FIG. 3 is an example interface that includes a supplemental information display area and information related to an item offered for sale, in accordance with some example embodiments.

FIG. 3 is an example listing interface for an item offered for sale, in accordance with some example embodiments. Interface 300 may be associated with an item that is offered for sale using an auction format. The interface 300 may include title information 310, seller's identification 315, other seller's information 320 (e.g., feedback, ask question, favorite, other items, etc.), current high bidder information 325, total number of bids 330, remaining time information 340, current bid price 345, and so on. There may be a display area 305 to display an image or information related to the item offered for sale. The interface 300 may also include other information including, for example, shipping information, etc. The information described above with the interface 300 may be considered standard information.

For some example embodiments, the interface 300 may also include a supplemental information display area 335 to display the supplemental information 140, which may be presented by the supplemental information display application 211 (illustrated in FIG. 2). Merely as an example, the supplemental information display area 335 is configured to be displayed in the same webpage as the interface 300. It may be noted that location of the supplemental information display area 335 illustrated in FIG. 3 is for illustration purpose only and is not meant to be restrictive.

For some example embodiments, the supplemental information display area 335 may be presented as a separate webpage or in a separate window (e.g., pop-up window). For some example embodiments, the supplemental information display area 335 may be configured to display one or more of images, text, audio, and video information individually or in combinations.

For some example embodiments, when the supplemental information display area 335 is configured to display video information, the supplemental information display area 335 may display a software implemented video player. An example of a software implemented video player is Real-Player from RealNetworks, Inc. of Seattle, Wash.

For some other example embodiments, the supplemental information display area 335 may display a Universal Resource Locator (URL) link. The URL link may be associated with another interface to display the supplemental information 140. When the URL link is selected, this other interface may be displayed. For example, this other interface may include a software-implemented video player.

For some example embodiments, the supplemental display area 335 may be associated with an interface that is different and separate from the interface (e.g., interface 300) used to display the information about the item offered for sale. For example, the supplemental display area 335 may be associated with a web browser window, a desktop application window, a screen saver application, and so on.

Video Examples

For some example embodiments, when the supplemental information is presented as a video, the supplemental information display application 211 may perform operations that retrieve video format of the supplemental information 140 from the database 220 (illustrated in FIG. 2). The video format may be in a format that enables storing and delivery efficiency. This may relate to a size requirement to store the supplemental information 140 and bandwidth requirement to deliver the supplemental information 140.

For some example embodiments, the supplemental information 140 may be pushed as snippets. The snippets may be within a time period such as, for example, five minutes. This may entice the users who are potential buyers or bidders to stay on with a listing for the duration of the snippets. This may be convenient because the potential buyers may not need to spend time pulling information from the databases, as is typically done when they have to select many of the options available on the interface 300. The supplemental information may be pushed by supplemental information display applications 211 to the potential buyers. This technique of pushing or delivering the supplemental information to the potential buyers may help these buyers make more informed bidding decisions (e.g., as in an auction format) or purchase decisions (e.g., as in non-auction format) within a relatively short time.

Screen-Saver Examples

For some example embodiments, the supplemental information display applications 211 may be configured to push the supplemental information 140 automatically to a display screen in the form of screen savers.

The supplemental information display applications 211 may detect that a user is signed in to the network-based marketplace. When there is no activity by the user for a certain time period, the supplemental information display application 211 may display the supplemental information 140 as screen savers. The supplemental information display application 211 may interact with an operating system (OS)

of the user's computer system (e.g., receiving client 230 or 235) to display the supplemental information 140 as the screen savers.

For some example embodiments, the supplemental information display applications 211 may dynamically change the supplemental information 140 being displayed. For example, when a buyer specified two or more items to be included in a watchlist (managed by an items watchlist application, as described below), the supplemental information display applications 211 may change from the supplemental information associated with the first item in the watchlist to the supplemental information associated with the second item in the watchlist, and so on.

Broadcast Examples

As described above, the supplemental information broadcast application 210 may push the supplemental information 140 as video streams using broadcast signals. In these situations, a broadcast channel may be configured to receive the supplemental information 140. Using this technique, a user may not need to visit a website associated with the network-based system 702 to view the supplemental information. The supplemental information 140 may be transmitted for entertainment purposes by the users who may or may not want to purchase any of the items associated with the supplemental information 140.

For some examples embodiments, the supplemental information 140 may be stored for subsequent delivery or viewing. For example, the supplemental information 140 may be stored using a device similar to a Tivo digital video recorder of Tivo, Inc. in Alviso, Calif.

For some example embodiments, the supplemental information 140 may be transmitted via an Internet Protocol (IP) address. This may be transmitted as streaming video via the network 221 (illustrated in FIG. 2).

Figure 4:
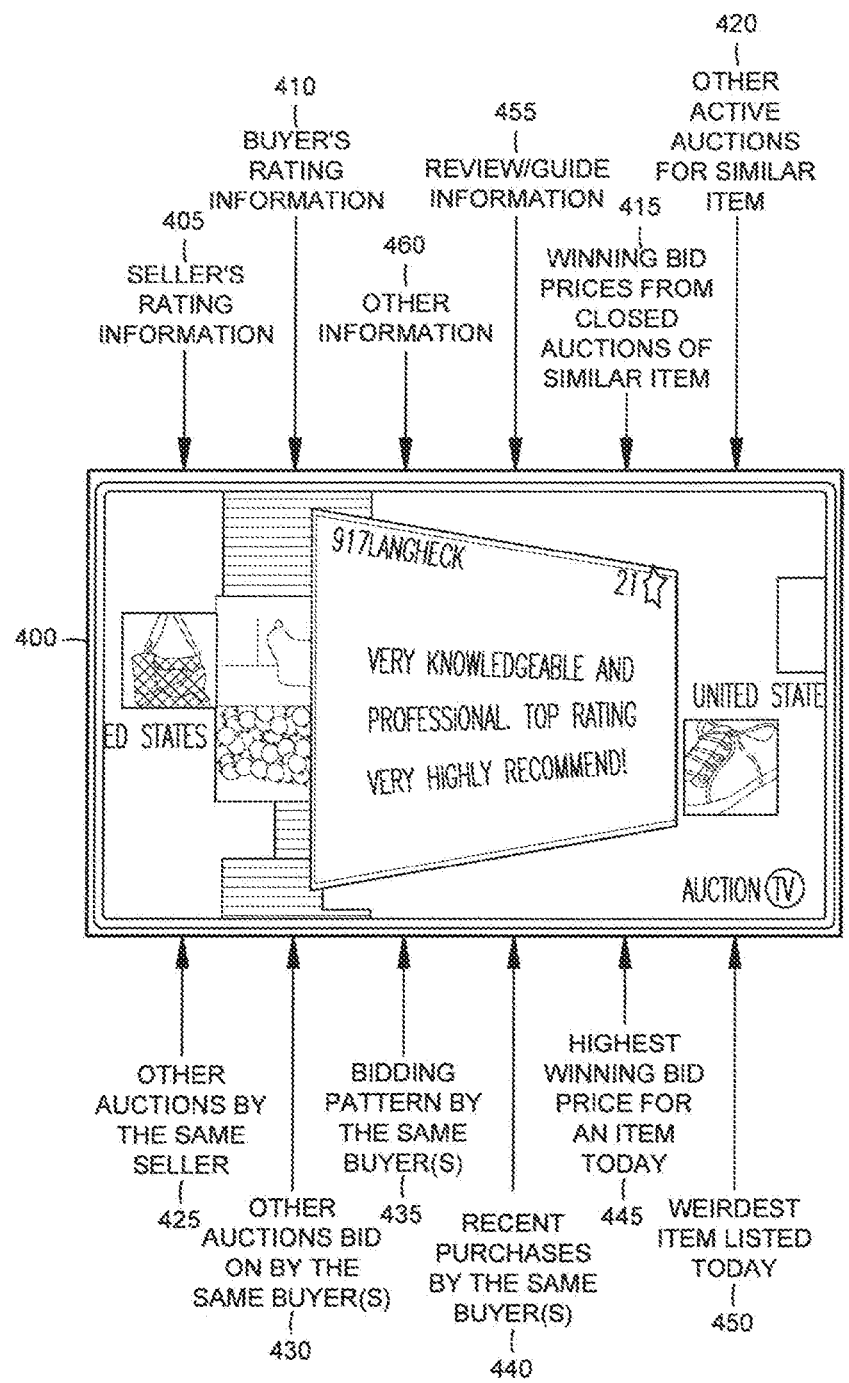
FIG. 4 illustrates an example of a display interface that may be used to display the supplemental information, in accordance with some embodiments.

FIG. 4 illustrates an example of a display interface that may be used to display the supplemental information, in accordance with some embodiments. Merely as an example, display interface 400 may display video, text, and images information which may be related to the items, the seller(s), and the buyer(s). The display interface 400 may be a television monitor or screen, and it may display the supplemental information 140 received via broadcast signals as video streams. The display interface 400 may be associated with a computer system, and it may display the supplemental information 140 received via a network as screen savers, video streams, web pages, etc.

The supplemental information 140 displayed on the display screen 400 may include, for example, seller's rating information 405, buyer's rating information 410, other items offered for sale by the same seller 425, other items bid by the same buyer 430, a bidding pattern of the same buyer 435, recent purchases by the same buyer 440, winning bid prices from closed auction of similar items 415, prices of other similar items currently available 420, highest winning bid price for an item today 445, weirdest item listed today 450, review information about an item 455, and any other information 460 that may be useful and/or entertaining to the users.

For some example embodiments, one or more indicators may be associated with each item offered for sale. An indicator may be set when the item falls into a category that may be considered to be interesting to the users. The indicators may enable the supplemental information applications 209 to identify the item and to include its information in the supplemental information 140.

Application Modules

Figure 5:
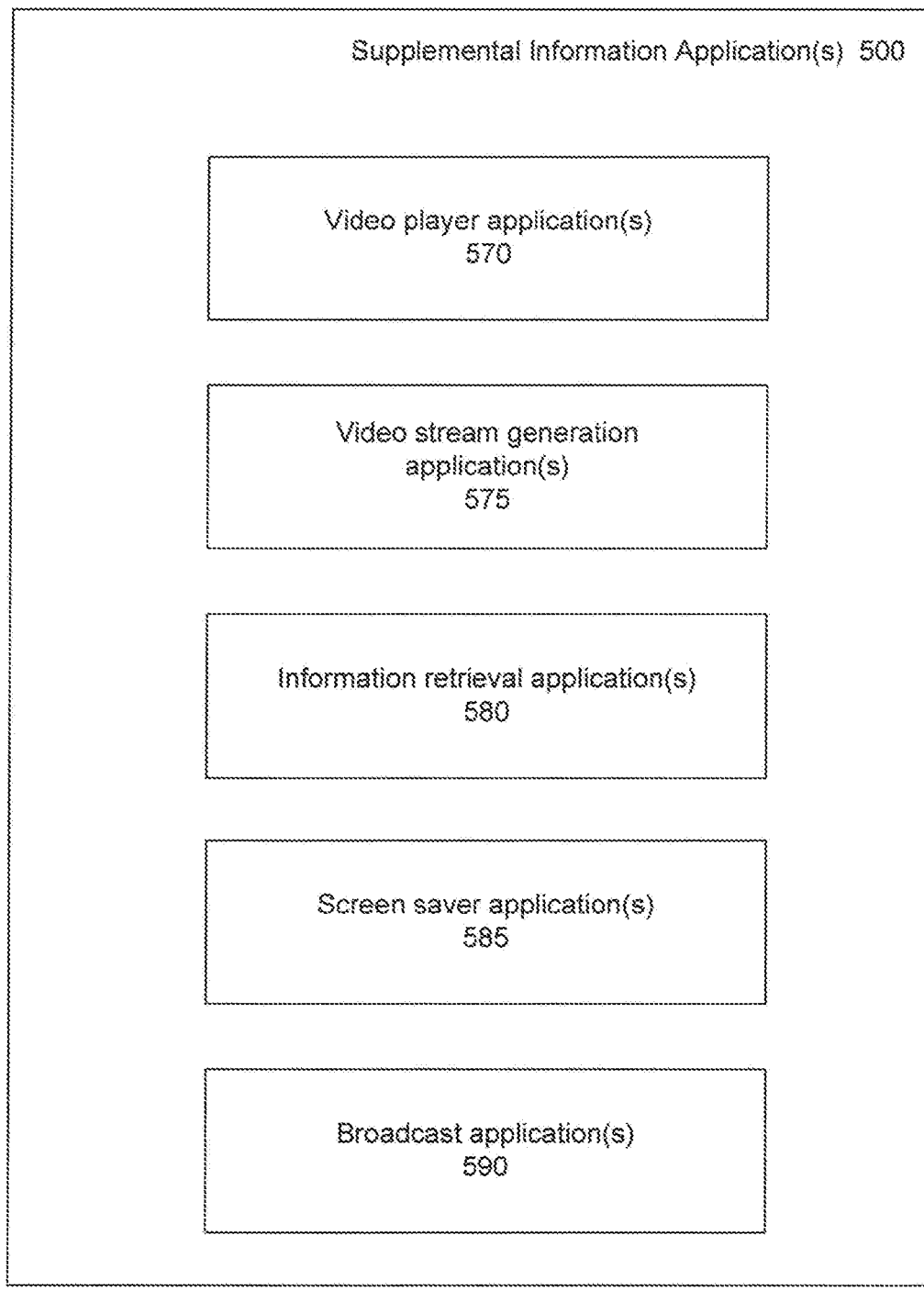
FIG. 5 illustrates examples of application modules that may be included in the supplemental information applications, in accordance with some embodiments.

FIG. 5 illustrates examples of application modules that may be included in the supplemental information applications, in accordance with some embodiments. The supplemental information applications 500 may be similar to the supplemental information applications 209 described in FIG. 2. The supplemental information applications 500 also include video player applications 570, video stream generation applications 575 and screen saver applications 585.

The information retrieval applications 580 may search the databases 220 to find the supplemental information 140 related to the items offered for sale, the sellers' information, the buyers' information, etc. The supplemental information 140 may be sent to the video stream generation applications 575 where video information may be generated. The video information may then be sent to the video player applications 570 to enable the supplemental information 140 to be viewed by the users.

For some example embodiments, the screen saver applications 585 may enable displaying the supplemental information 140 as screen savers. The screen savers applications 585 may monitor for user's inactivity and may determine content of the screen savers to be displayed. The broadcast applications 590 may receive the supplemental information 140 from the information retrieval applications 580 and may generate and deliver video streams using broadcast signals.

Flow Diagrams

Figure 6A:
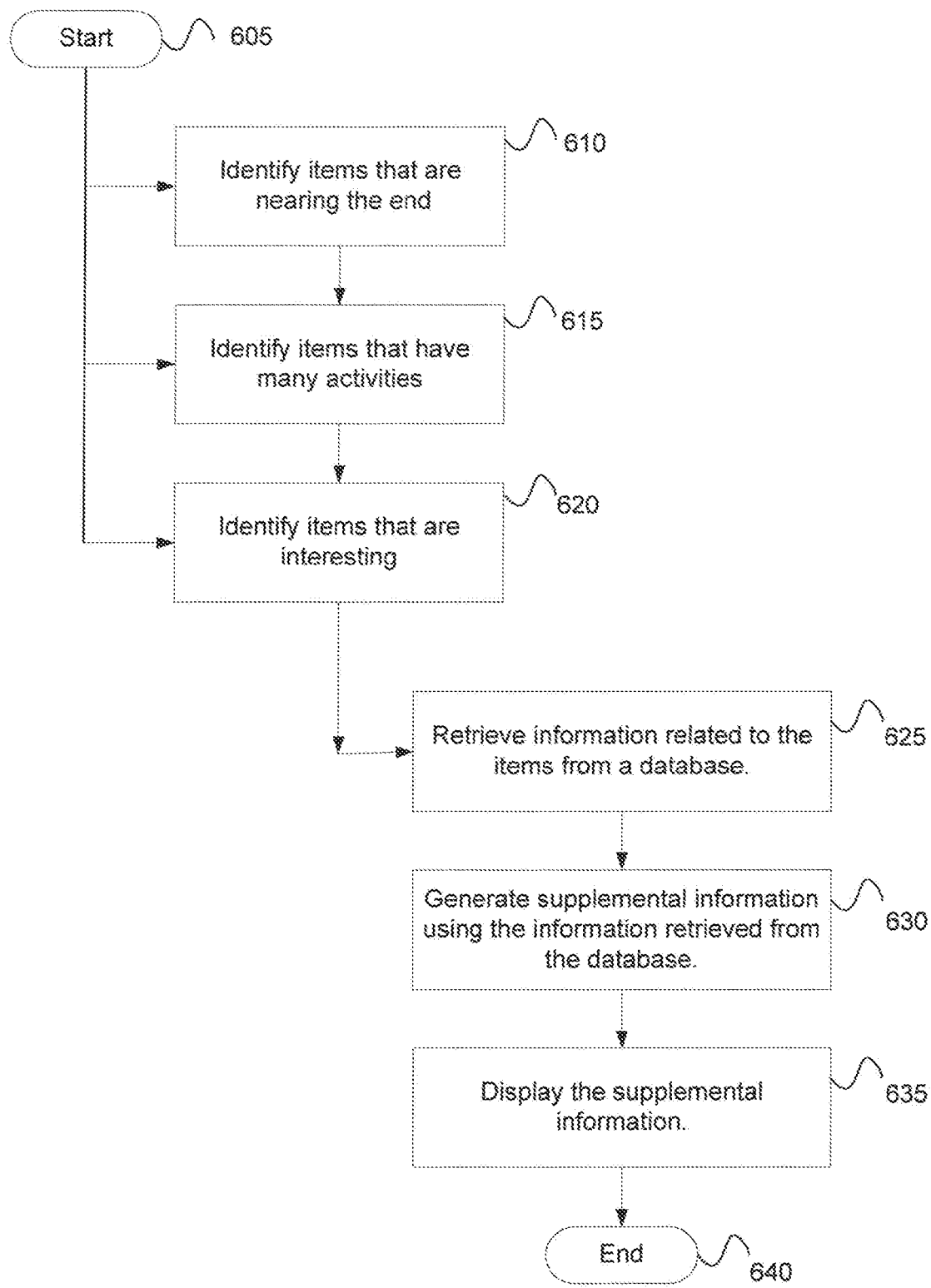
FIG. 6A illustrates an example of a flow diagram corresponding to a method that may be used to display the supplemental information, in accordance with some embodiments.

FIG. 6A illustrates an example of a flow diagram corresponding to a method that may be used to display the supplemental information, in accordance with some embodiments. The method may be performed by the supplemental information applications 209 illustrated in FIG. 2 (or applications 500 illustrated in FIG. 5). Although the method may be described with items offered for sale in the auction format, it may also be used with other non-auction formats. The method may start at block 605. The method may continue to one or more of blocks 610, 615 and 620. At block 610, auctions that are near the end may be identified. At block 615, auctions that have many activities may be identified. At block 620, auctions that have interesting items may be identified. Other criteria may also be used to identify the items. As mentioned above, the items may not necessarily be associated with an auction. For example, block 610 may be used to identify an item that is nearing the end of its listing duration; block 615 may be associated with an item that many users have viewed; block 620 may be associated with an interesting item.

From one or more of the blocks 610, 615 and 620, the method may continue to block 625 where information related to the item may be retrieved from a database. Information may also be received from one or more external sources. At block 630, the information received at block 625 may be processed to generate the supplemental information. Depending on the destination, the supplemental information may be converted to a format appropriate for display. At block 635, the supplemental information may be displayed. This may be via a video player, as a screen saver, via a broadcast channel, as a webpage, as a pop-up window, etc. The method may end at block 640.

Figure 6B:
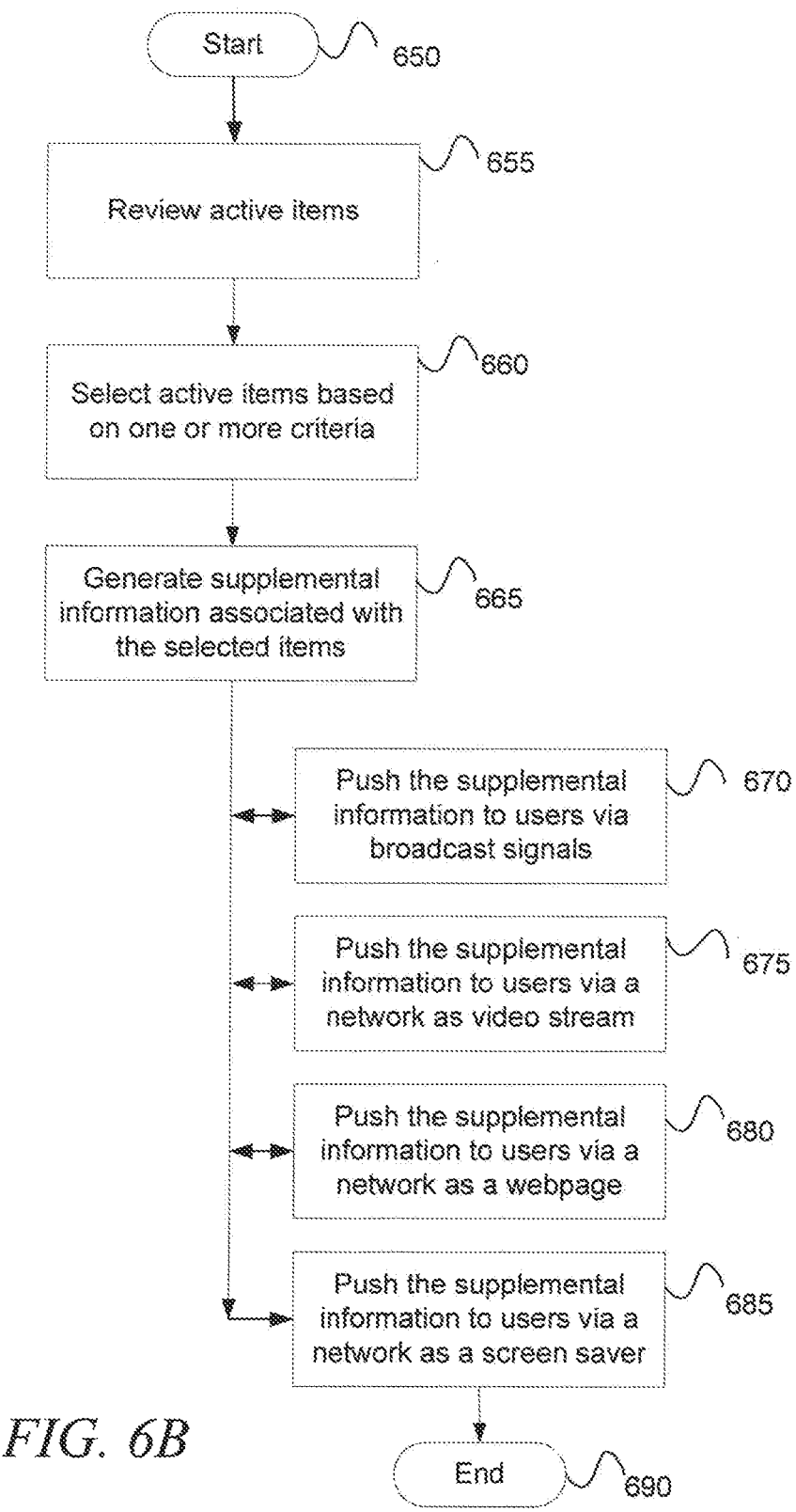
FIG. 6B illustrates an example of a flow diagram corresponding to a method that may be used to push the supplemental information, in accordance with some embodiments.

FIG. 6B illustrates an example of a flow diagram corresponding to a method that may be used to push the supplemental information, in accordance with some embodiments. The method may be performed by the supplemental information applications 209 illustrated in FIG. 2 (or applications 500 illustrated in FIG. 5). The method may start at block 650. At block 655, items that are active may be reviewed. A set of one or more criteria may be used when reviewing the active items so that a subset of the active items may be selected, as shown in block 660. For example, the set of criteria may be used to select items that have low activities, items that have high activities, items that are at the end of the listing duration, etc. At block 665, the supplemental information 140 associated with the selected items may be generated using the information stored in the databases (e.g., databases 105-120 illustrated in FIG. 1). The supplemental information 140 may be generated using various combinations of the information stored in the databases forming customized information. For some example embodiments, the customized information may be used in entertainment programs which may be viewed by the users via a network (e.g., the Internet) or via broadcast signals (e.g., television signals).

It may be noted that the method generally pushes information stored in the database toward the users for viewing. There may be minimal or no requirements on the parts of the users to pull the information.

From block 665, the method may then continue to one or more of the blocks 670-685. At block 670, the supplemental information 140 may be pushed to the users via broadcast signals. At block 675, the supplemental information 140 may be pushed to the users via a network as a video stream. At block 680, the supplemental information 140 may be pushed to the users via a network as a webpage. At block 685, the supplemental information 140 may be pushed to the users via a network as a screen saver. The method may end at block 690.

For some example embodiments, instead of selecting a subset of the active items, any information related to any of the active items or non-active items may be used to generate the supplemental information.

Platform Architecture

Figure 7:
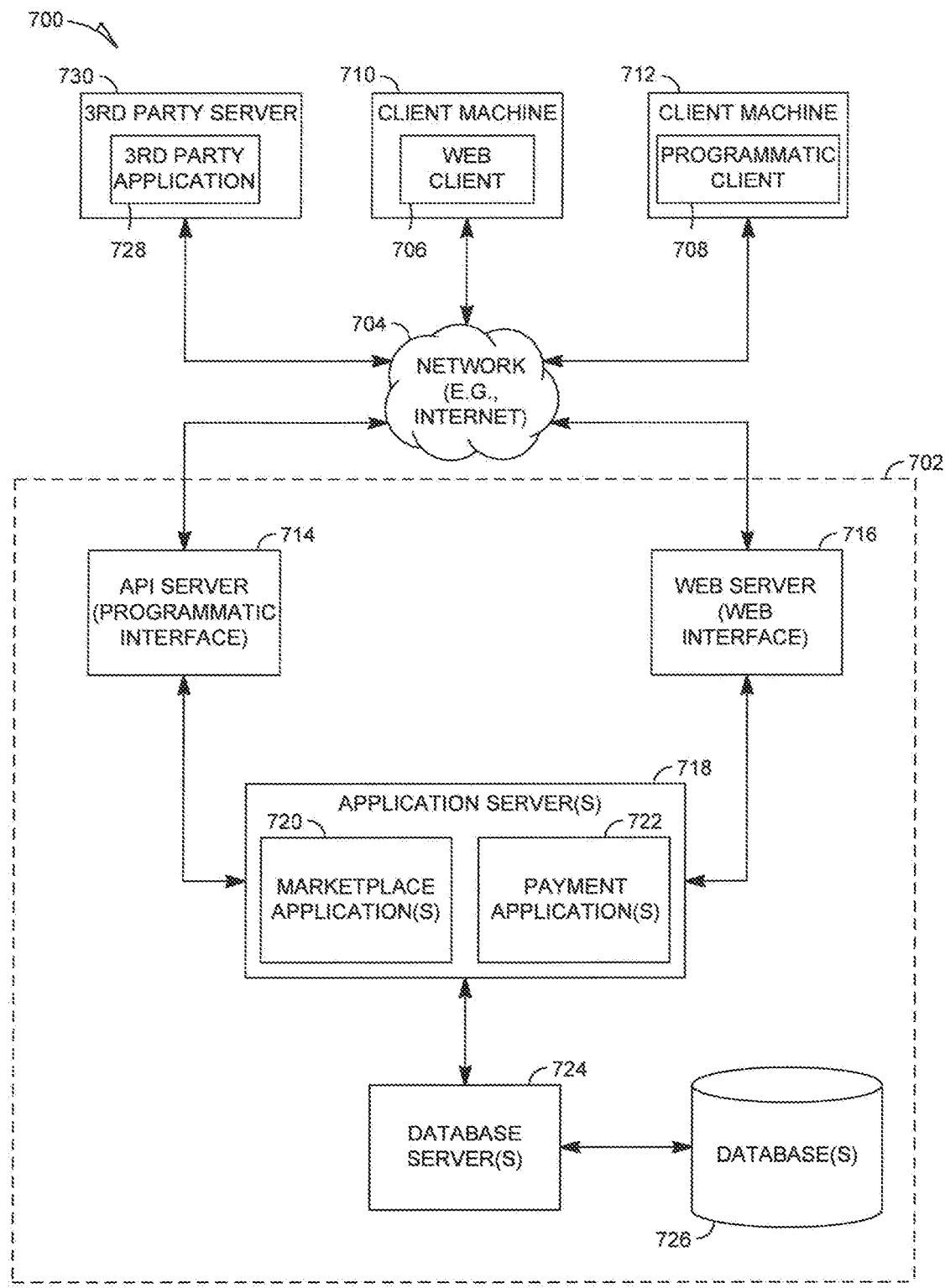
FIG. 7 illustrates an example system diagram that may be used, in accordance with some example embodiments.

FIG. 7 illustrates an example system diagram that may be used, in accordance with some example embodiments. System 700 may include a network and may be implemented using client-server architecture. A commerce platform, in the example form of a network-based system 702, may provide server-side functionality, via network 704 (e.g., the Internet) to one or more clients. FIG. 7 illustrates, for example, a web client 706 (e.g., a browser, such as the Internet Explorer® browser developed by Microsoft® Corporation of Redmond, Wash.), and a programmatic client 708 executing on respective client machines 710 and 712.

The network-based system 702 may include an application program interface (API) server 714 and a web server 716. The API server 714 and the web server 716 may be coupled to one or more application servers 718. The API server 714 and the web server 716 may provide programmatic and web interfaces to the one or more application servers 718. The application servers 718 may host one or more marketplace applications 720 and one or more payment applications 722. The application servers 718 may be coupled to one or more database servers 724 that facilitate access to information stored in one or more databases 726.

For some example embodiments, the marketplace applications 720 may provide a number of marketplace functions and services to users that access the network-based system 702. The payment applications 722 may provide a number of payment services and functions to the users. The payment applications 722 may allow the users to quantify and accumulate value (e.g., in a commercial currency, such as the U.S. dollar, or a proprietary currency, such as "points") in accounts, and then later to redeem the accumulated value for products (e.g., goods or services) that are made available via the marketplace applications 720.

In the current example, the marketplace applications 720 and the payment applications 722 are shown in FIG. 1 to form part of the network-based system 702. It will be appreciated that, in alternative example embodiments, the payment applications 722 may form part of a payment service that is separate and distinct from the network-based system 702.

In the current example, the system 700 shown in FIG. 7 employs client-server architecture. It will be appreciated that the example embodiments are of course not limited to such architecture and could equally well find applications in a distributed or peer-to-peer architecture. The marketplace applications 720 and payment applications 722 may also be implemented as standalone software programs, which do not necessarily have networking capabilities.

The web client 706 may access services and functions provided by the marketplace applications 720 and the payment applications 722 via the web interface supported by the web server 716. Similarly, the programmatic client 708 may access services and functions provided by the marketplace applications 720 and the payment applications 722 via the programmatic interface provided by the API server 714. The programmatic client 708 may, for example, be a seller application (e.g., the TurboLister application developed by eBay Inc., of San Jose, Calif.) to enable sellers to author and manage listings on the network-based system 702 in an off-line manner and to perform batch-mode communications between the programmatic client 708 and the network-based system 702.

FIG. 7 also illustrates a third party application 730, executing on a third party server machine 730, as having programmatic access to the network-based system 702 via the programmatic interface provided by the API server 714. For example, the third party application 728 may, utilizing information retrieved from the network-based system 702, support one or more features or functions on a website hosted by a third party, referred to as a third party website. The third party website may, for example, provide one or more promotional, marketplace or payment functions that are supported by the relevant applications of the network-based system 702.

Marketplace Application(s)

Figure 8:
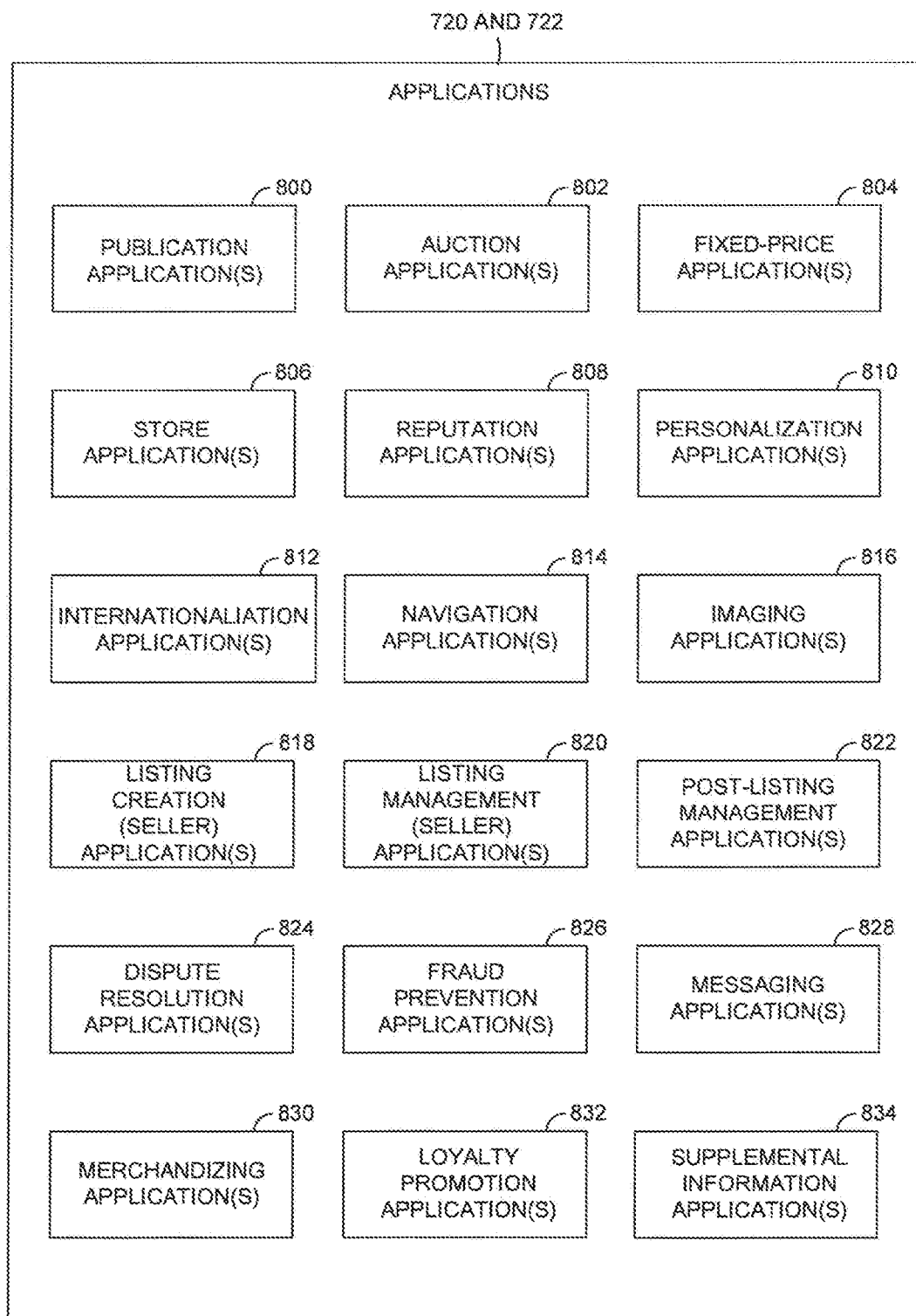
FIG. 8 illustrates an example block diagram showing multiple marketplace applications that may be provided as part of a network-based marketplace, in accordance with some example embodiments.

FIG. 8 illustrates an example block diagram showing multiple marketplace applications that may be provided as part of a network-based marketplace, in accordance with some example embodiments. The network-based system 702 may include various market place applications 720 and payment applications 722.

The marketplace applications 720 may include one or more publication applications 800 which may provide a number of listing and price-setting mechanisms whereby a seller may list goods or services for sale, a buyer can express interest in or indicate a desire to purchase such goods or services, and a price can be set for a transaction pertaining to the goods or services.

The marketplace applications 720 may include one or more auction applications 802 which support auction-format listing and price setting mechanisms (e.g., English, Dutch, Vickrey, Chinese, Double, Reverse auctions, etc.). The various auction applications 802 may also provide a number of features in support of such auction-format listings, such as a reserve price feature whereby a seller may specify a reserve price in connection with a listing and a proxy-bidding feature whereby a bidder may invoke automated proxy bidding.

The marketplace applications 720 may include one or more fixed-price applications 804. The fixed-price applications 804 may support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with an auction-format listing, and allow a buyer to purchase goods or services, which are also being offered for sale via an auction, for a fixed-price that may be higher than the starting price of the auction.

The marketplace applications 720 may include one or more store applications 806. The store applications 806 may allow sellers to group their listings within a "virtual" store, which may be branded and otherwise personalized by and for the sellers. Such a virtual store may also offer promotions, incentives and features that are specific and personalized to a relevant seller.

The marketplace applications 720 may include one or more reputation applications 808. The reputation applications 808 may allow parties that transact utilizing the network-based system 702 to establish, build, and maintain reputations, which may be made available and published to potential trading partners. Consider that where, for example, the network-based system 702 supports person-to-person trading, users may have no history or other reference information whereby the trustworthiness and credibility of potential trading partners may be assessed. The reputation applications 808 may allow a user, for example through feedback provided by other transaction partners, to establish a reputation within the network-based system 702 over time. Other potential trading partners may then reference such a reputation for the purposes of assessing credibility and trustworthiness.

The marketplace applications 720 may include one or more personalization applications 810. The personalization applications 810 may allow users of the network-based system 702 to personalize various aspects of their interactions with the network-based system 702. For example a user may, utilizing an appropriate personalization application(s) 810, create a personalized reference page at which information regarding transactions to which the user is (or has been) a party may be viewed. Further, a personalization application 810 may enable a user to personalize listings and other aspects of their interactions with the network-based system 702 and other parties.

For some example embodiments, the marketplace applications 720 may include international application(s) 812. The international application(s) 812 may be used by the network-based system 702 to support a number of marketplaces that are customized for specific geographic regions. For example, there may be a version of the network-based system 702 customized for the United Kingdom, and there may be another version of the network-based system 702 customized for the United States. Each of these versions may operate as an independent marketplace, or they may be customized (or internationalized) presentations of a common underlying marketplace.

For some example embodiments, the marketplace application 720 may include navigation applications 814 to facilitate navigating of the network-based system 702. For example, the navigation applications 814 may include a search module and a browse module. The search module may enable keyword searches of listings published via the network-based system 702. The browse module may allow users to browse various category, catalogue, or inventory data structures according to which listings may be classified within the network-based system 702. Various other navigation applications modules may be provided to supplement the search and browse modules.

In order to make listings, available via the network-based system 702, as visually informing and attractive as possible, the marketplace applications 720 may include one or more imaging applications 816. Users may upload images for inclusion within listings. An imaging application 816 may also operate to incorporate images within viewed listings. The imaging applications 816 may also support one or more promotional features, such as image galleries that are presented to potential buyers. For example, sellers may pay an additional fee to have an image included within a gallery of images for promoted items.

For some example embodiments, the marketplace applications 720 may include one or more listing creation applications 818. The listing creation applications 818 may allow sellers conveniently to author listings pertaining to goods or services that they wish to transact via the network-based system 702. As will be described in more detail, the listing creation applications 818 may include modules that enable suggestions of item descriptions, in some example embodiments.

For some example embodiments, the marketplace applications 720 may include listing management applications 820 to allow sellers to manage such goods or services listings. Specifically, where a particular seller has authored and/or published a large number of listings, the management of such listings may present a challenge. The listing management applications 820 may provide a number of features (e.g., auto-relisting, inventory level monitors, etc.) to assist the seller in managing such listings.

One or more post-listing management applications 822 also assist sellers with a number of activities that typically occurs post-listing. For example, upon completion of an auction facilitated by one or more auction applications 802, a seller may wish to leave feedback regarding a particular buyer. To this end, a post-listing management application 822 may provide an interface to one or more reputation applications 808, so as to allow the seller conveniently to provide feedback regarding multiple buyers to the reputation applications 808. As another example, upon completion of an auction where the goods or services has not sold, the item may automatically be relisted in the auction application(s) 802 and/or the fixed-price application(s) 804.

The marketplace applications 720 may include dispute resolution applications 824. The dispute resolution applications 824 provide mechanisms whereby disputes arising between transacting parties may be resolved. For example, the dispute resolution applications 824 may provide guided procedures whereby the parties are guided through a number of steps in an attempt to settle a dispute. In the event that the dispute cannot be settled via the guided procedures, the dispute may be escalated to a third party mediator or arbitrator.

The marketplace applications 720 may include fraud prevention applications 826. A number of fraud prevention applications 826 implement various fraud detection and prevention mechanisms to reduce the occurrence of fraud within the network-based system 702.

The marketplace applications 720 may include messaging applications 828. The messaging applications 828 are responsible for the generation and delivery of messages to users of the network-based system 702. Such messages, for example, advise users regarding the status of listings at the network-based system 702 (e.g., providing "outbid" notices to bidders during an auction process or to provide promotional and merchandising information to users).

The marketplace applications 720 may include merchandising applications 830. The merchandising applications 830 may support various merchandising functions that are made available to sellers to enable sellers to increase sales via the network-based system 702. The merchandising applications 830 also operate the various merchandising features that may be invoked by sellers, and may monitor and track the success of merchandising strategies employed by sellers.

The network-based system 702 itself, or one or more parties that transact via the network-based system 702, may operate loyalty programs that are supported by one or more loyalty/promotions applications 832. For example, a buyer may earn loyalty or promotions points for each transaction established and/or concluded with a particular seller, and may be offered a reward for which accumulated loyalty points can be redeemed.

The marketplace applications 702 may include supplemental information applications 834. The supplemental information applications 834 may retrieve information related to items offered for sale from the databases 726 (illustrated in FIG. 7). The databases 726 may include one or more databases 105-120 (illustrated in FIG. 1). The supplemental information applications 834 may interact with one or more of the auction application(s) 802, fixed-price applications 804, reputation applications 808, merchandising applications 830, and other applications of the marketplace applications 720. The supplemental information applications 834 may include applications that are associated with causing one or more of text, images, audio, and video information to be displayed using an interface associated with the network-based system 702.

Even though the context of this description is with regard to marketplace applications, it is to be understood by those of skill in the art that the described subject matter may also be applicable to other types of applications for various types of transactions. The transactions may include those between a single seller and a single buyer or may include those between a single seller and multiple buyers, and may include selling a catalog-type product, or even a more unique product. It may also be noted that although the description may refer to a seller or a buyer in commerce or marketplace environments, certain aspects of the description may also be applicable to non-commerce environments.

Database Tables

Figure 9A:
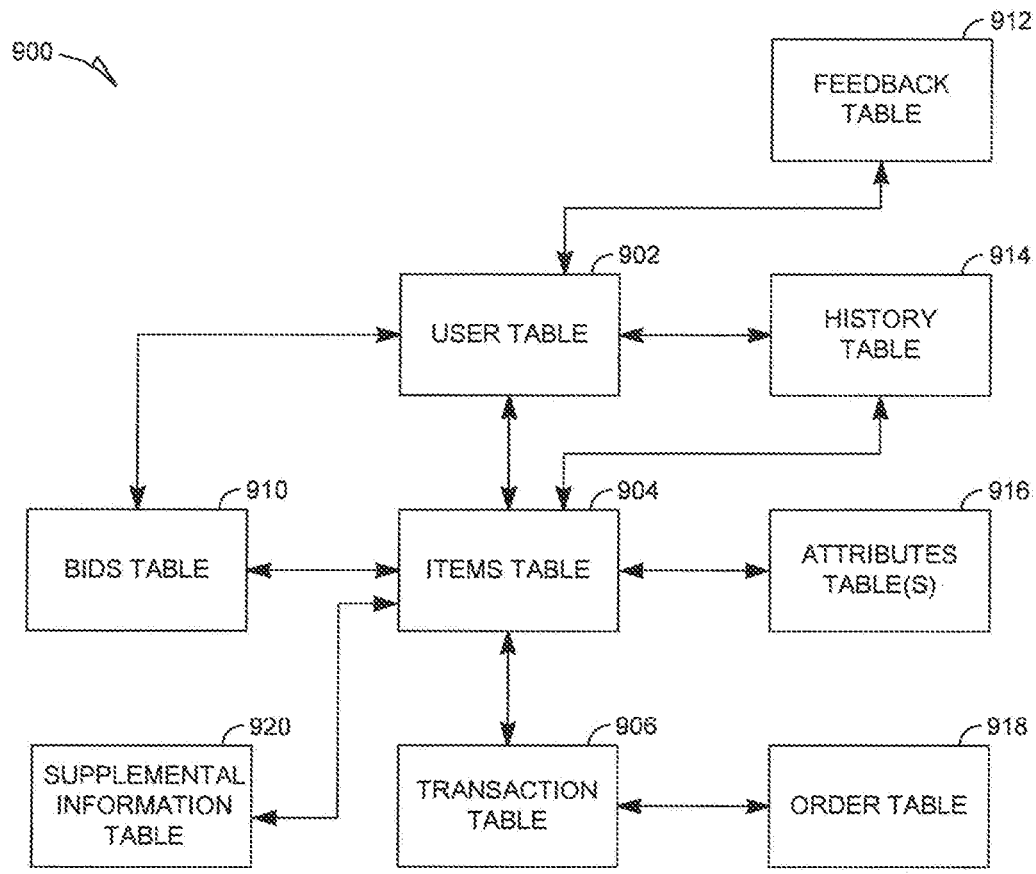
FIGS. 9A-9B illustrates a high-level entity-relationship diagram, illustrating various example tables, in accordance with some example embodiments.

FIG. 9A is a high-level entity-relationship diagram, illustrating various tables 900 that may be maintained within the databases 726, and that are utilized by and support the applications 720 and 722. A user table 902 contains a record for each registered user of the network-based system 702, and may include identifier, address and financial instrument information pertaining to each such registered user. A user may operate as a seller, a buyer, or both, within the network-based system 702. In one example embodiment, a buyer may be a user that has accumulated value (e.g., commercial or proprietary currency), and is accordingly able to exchange the accumulated value for items that are offered for sale by the network-based system 702.

The tables 900 also include an items table 904 in which are maintained item records for goods and services that are available to be, or have been, transacted via the network-based system 702. Each item record within the items table 904 may furthermore be linked to one or more user records within the user table 902, so as to associate a seller and one or more actual or potential buyers with each item record.

A transaction table 906 contains a record for each transaction (e.g., a purchase or sale transaction) pertaining to items for which records exist within the items table 904.

An order table 918 is populated with order records, each order record being associated with an order. Each order, in turn, may be with respect to one or more transactions for which records exist within the transaction table 906.

Bid records within a bids table 910 each relate to a bid received at the network-based system 702 in connection with an auction-format listing supported by an auction application 802. A feedback table 912 is utilized by one or more reputation applications 808, in one example embodiment, to construct and maintain reputation information concerning users. A history table 914 maintains a history of transactions to which a user has been a party. One or more attributes tables 916 record attribute information pertaining to items for which records exist within the items table 904. Considering only a single example of such an attribute, the attributes tables 916 may indicate a currency attribute associated with a particular item, the currency attribute identifying the currency of a price for the relevant item as specified in by a seller. Supplemental information table 920 may include information that may be used to push the supplemental information 140 to the users.

Figure 9B:
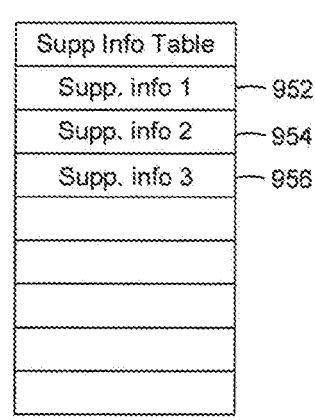

FIG. 9B provides further details regarding a supplemental information table shown in FIG. 9C that may be maintained within the databases 726. As illustrated, the supplemental information table 920 may include multiple fields. Each of the fields may be associated with some supplemental information (e.g., supplemental information 952-956) that may be pushed to the users.

Computer System

Figure 10:
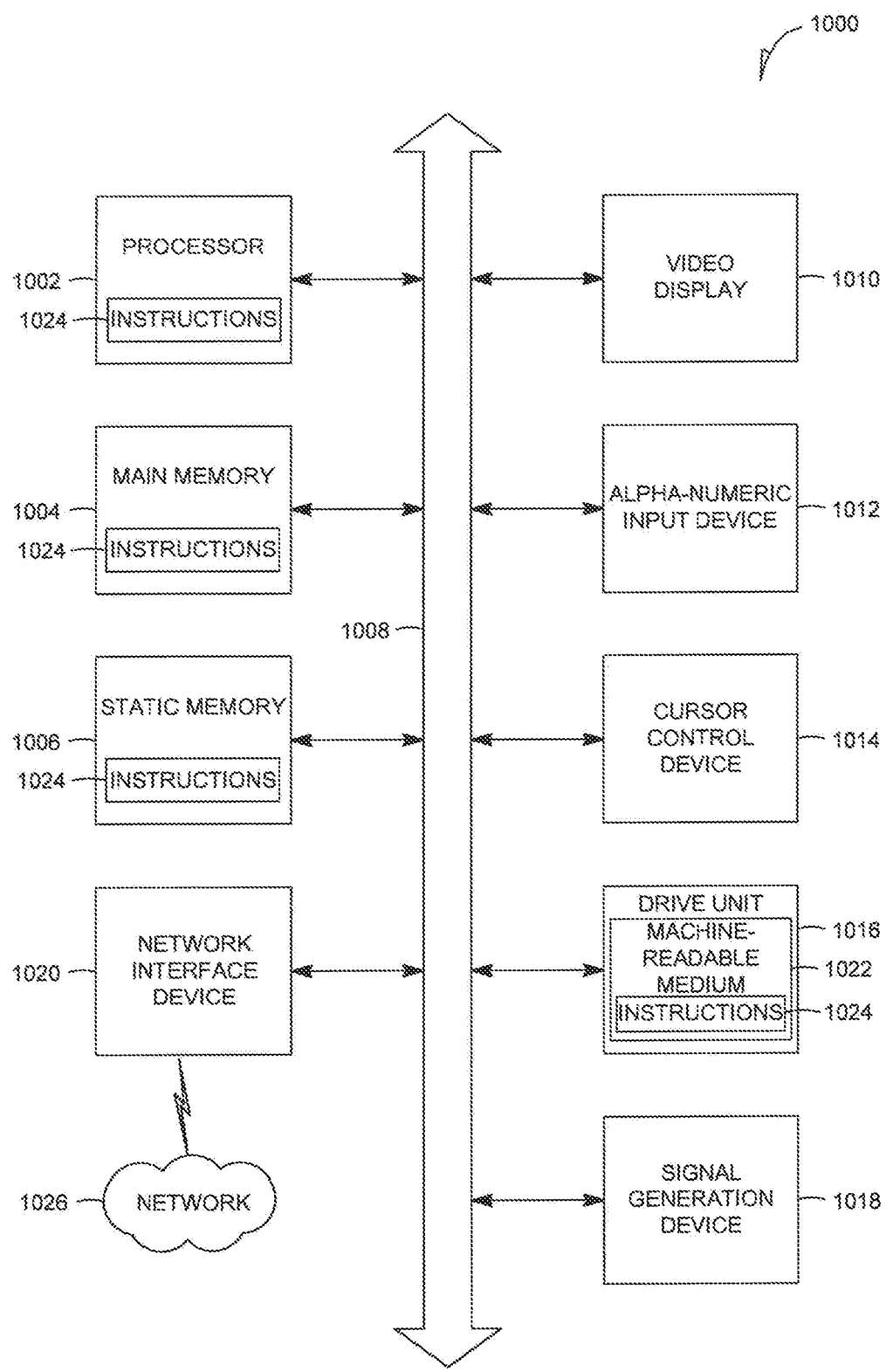
FIG. 10 illustrates an example diagram of a representation of a machine in the example form of a computer system that may be used, in accordance with some example embodiments.

FIG. 10 illustrates an example diagram of a representation of a machine in the example form of a computer system that may be used, in accordance with some example embodiments. A set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

In the current example, computer system 1000 may include a processor 1002 (e.g., a central processing unit (CPU), a graphics processing unit (GPU), or both), a main memory 1004 and a static memory 1006, which communicate with each other via a bus 1008. The computer system 1000 may further include a video display unit 1010 (e.g., liquid crystals display (LCD) or a cathode ray tube (CRT)). The computer system 1000 also includes an input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions (e.g., software 624) embodying any one or more of the methodologies or functions described herein. The instructions 1024 may also reside, completely or at least partially, within the main memory 1004, the static memory 1006, and/or within the processor 1002 during execution thereof by the computer system 1000. The main memory 1004 and the processor 1002 also may constitute machine-readable media.

The instructions 1024 may further be transmitted or received over a network 1026 via the network interface device 1020. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In example embodiments, a computer system (e.g., a standalone, client or server computer system) configured by an application may constitute a "module" that is configured and operates to perform certain operations as described herein below. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories, optical and magnetic media, and carrier wave signals.

As noted, the software may be transmitted over a network using a transmission medium. The term "transmission medium" shall be taken to include any medium that is capable of storing, encoding or carrying instructions for transmission to and execution by the machine, and includes digital or analog communications signal or other intangible medium to facilitate transmission and communication of such software.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure.

It may be appreciated that FIGS. 1-10 are merely representational and may not be drawn to scale. Certain proportions thereof may be exaggerated, while others may be minimized. Accordingly, the specification and drawings are to be regarded in an illustrative rather than a restrictive sense.

In the foregoing description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the description, with each claim standing on its own as a separate embodiment.

Thus, a method and system to push information related to items offered for sale to potential buyers or viewers have been described. Although embodiments have been described with reference to specific example embodiments, it will be evident that various modifications and changes may be made to these embodiments without departing from the broader spirit and scope of embodiments as expressed in the subjoined claims.

What is claimed is:

1. A computer-implemented method comprising:
    identifying, in a network-based marketplace, a listing of an item offered for sale, wherein the listing is associated with a first set of information describing the listing;
    receiving, from a remote computing device, one or more actions associated with the first set of information;
    based on the one or more actions, identifying a second set of information to supplement the first set of information;
    identifying one or more multimedia programs comprising at least (1) a portion of the second set of information and (2) snippets relating to the item and a seller of the item;
    automatically pushing a video stream of at least the portion of the second set of information and the snippets to the remote computing device; and
    causing the video stream to be displayed on the remote computing device, wherein the video stream is displayed in a video player embedded in a webpage.

2. The computer-implemented method of claim 1, wherein the listing is selected from a set of listings relating to items that are nearing an end of an offer period.

3. The computer-implemented method of claim 1, wherein the listing is selected from a set of listings identified as having increased bidding activity.

4. The computer-implemented method of claim 1, wherein the first set of information comprises at least two of: item price, item description, item image, and current bidding information.

5. The computer-implemented method of claim 1, wherein the second set of information comprises at least one of: items recently purchased by one or more bidders, items previously purchased by a current bidder, an item review guide, item use information, and related items offered by the seller of the item.

6. The computer-implemented method of claim 1, wherein the one or more multimedia programs correspond to at least one of text data, an image, and a video stream.

7. The computer-implemented method of claim 1, wherein the first set of information and the second set of information are presented on a webpage to a user.

8. The computer-implemented method of claim 1, wherein the one or more actions associated with the first set of information correspond to at leas tone of: browsing events, bidding events, and a listing expiration event.

9. The computer-implemented method of claim 1, wherein identifying the second set of information comprises: retrieving, from one or more data sets, data associated with the first set of information; and combining one or more portions of the retrieved data to dynamically generate the second set of information.

10. A system, comprising:
at least one processor; and
memory coupled to the at least one processor, the memory comprising computer executable instructions that, when executed by the at least one processor, perform a method comprising:
identifying, in a network-based marketplace, a listing of an item offered for sale, wherein the listing is associated with a first set of information describing the listing;
receiving, from a remote computing device, one or more actions associated with the first set of information;
based on the one or more actions, identifying a second set of information to supplement the first set of information;
identifying one or more multimedia programs comprising at least (1) a portion of the second set of information and (2) snippets relating to the item and a seller of the item;
automatically pushing a video stream of at least the portion of the second set of information and the snippets to the remote computing device; and
causing the video stream to be displayed on the remote computing device, wherein the video stream is displayed in a video player embedded in a webpage.

11. The system of claim 10, the method further comprising: identifying a set of listings identified as at least one of: nearing an end of an offer period, experiencing increased bidding activity, and experiencing increased browsing activity; and selecting the listing from the set of listings.

12. The system of claim 10, wherein the listing is selected from a set of listings identified as having at least one of: decreased bidding activity and decreased browsing activity.

13. The system of claim 10, wherein the first set of information comprises at least two of: item price, item condition, a seller identification, and seller rating.

14. The system of claim 10, wherein the second set of information comprises at least one of: other active transactions of the seller, previous transactions of the seller, other active transactions of a buyer, previous transactions of the buyer, and price information for other items similar to the item.

15. The system of claim 10, wherein identifying the one or more multimedia programs comprises using the second set of information to generate a first multimedia program comprising at least one of text data, an image, and video data.

16. The system of claim 10, wherein the first set of information is provided on a first webpage and the second set of information is provided on a second webpage.

17. The system of claim 10, wherein the one or more actions associated with the first set of information correspond to at least one of: browsing events, bidding events, a listing expiration event, and a listing modification event.

18. A computer-readable storage medium having no transitory signals and encoding computer executable instructions which, when executed by at least one processor, perform a method comprising:
identifying, in a network-based marketplace, a listing of an item offered for sale, wherein the listing is associated with a first set of information describing the listing;
receiving, from a remote computing device, one or more actions associated with the first set of information;
based on the one or more actions, identifying a second set of information to supplement the first set of information;
identifying one or more multimedia programs comprising at least (1) a portion of the second set of information and (2) snippets relating to the item and a seller of the item;
automatically pushing a video stream of at least the portion of the second set of information and the snippets to the remote computing device; and
causing the video stream to be displayed on the remote computing device, wherein the video stream is displayed in a video player embedded in a webpage.

19. The computer-readable storage medium of claim 18, the method further comprising: identifying a set of listings that are at least one of: nearing an end of an offer period, experiencing increased bidding activity, and experiencing increased browsing activity; and selecting the listing from the set of listings.

20. The computer-readable storage medium of claim 18, wherein the one or more actions associated with the first set of information correspond to at least one of browsing events, bidding events, a listing expiration event, and a listing modification event.

* * * * *

UNITED STATES PATENT AND TRADEMARK OFFICE
CERTIFICATE OF CORRECTION

PATENT NO. : 10,991,008 B2  
APPLICATION NO. : 15/993115  
DATED : April 27, 2021  
INVENTOR(S) : Jeffrey Loui et al.

Page 1 of 1

It is certified that error appears in the above-identified patent and that said Letters Patent is hereby corrected as shown below:

In the Claims

In Column 16, Line 67, in Claim 6, delete "of" and insert -- of: --, therefor.

In Column 17, Line 6, in Claim 8, delete "leas tone" and insert -- least one --, therefor.

In Column 18, Line 7, in Claim 15, delete "of" and insert -- of: --, therefor.

In Column 18, Line 49, in Claim 20, delete "of" and insert -- of: --, therefor.

Signed and Sealed this  
Twenty-sixth Day of October, 2021

Drew Hirshfeld  
*Performing the Functions and Duties of the*  
*Under Secretary of Commerce for Intellectual Property and*  
*Director of the United States Patent and Trademark Office*